Oct. 17, 1933.  E. A. FRIES ET AL  1,931,346
LINE FASTENER
Filed June 14, 1932
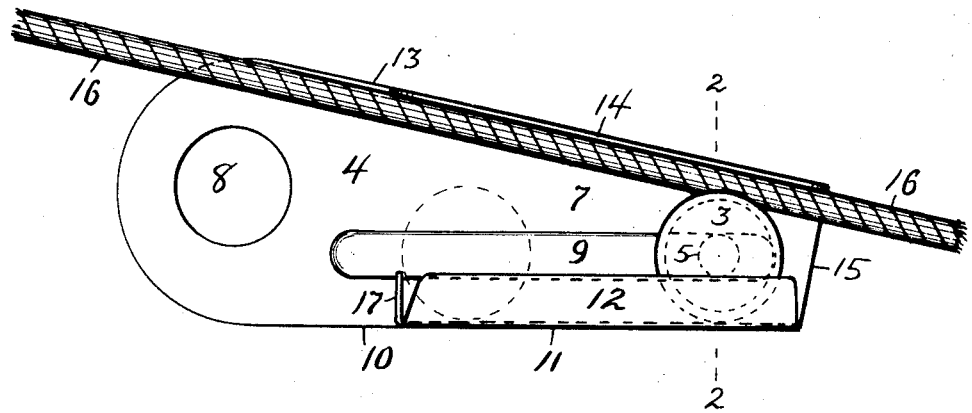
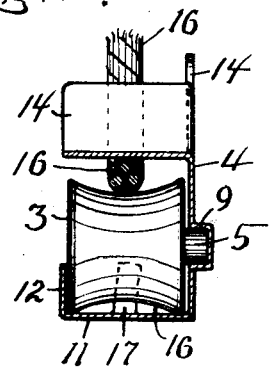
Edwin A. Fries
and
Vollmar Fries  INVENTORS
BY
H. G. Burns  ATTORNEY.

Patented Oct. 17, 1933

1,931,346

UNITED STATES PATENT OFFICE 1,931,346

LINE FASTENER

Edwin A. Fries and Vollmar Fries, Fort Wayne, Ind.

Application June 14, 1932. Serial No. 617,080

2 Claims. (Cl. 24—136)

This invention relates to improvements in line fasteners and the object thereof is to provide an inexpensive and simply operated device for grasping and holding a line in tension, and which may be readily applied and detached from the line. Another object is to construct the device with the parts thereof formed so as to be easily assembled.

An illustrative embodiment of the invention is shown in the accompanying drawing, in which:—

Fig. 1 is a side elevation of a fastener in which the invention is embodied applied to a line; and Fig. 2 is a transverse section of Fig. 1 on the line 2—2 thereof.

The structure shown in the drawing consists of a fastener constituted of two relatively movable parts, viz., a clamping roller 3 and a holder 4.

The roller is cylindrical and is provided at one end with an axially extending trunnion 5, the face 6 of the roller being concave.

The holder 4 preferably is formed of a sheet metal plate, the middle portion 7 of which is tapered and is provided adjacent one end with an opening 8 therein for the reception of a suitable securing means (not shown) for anchoring the holder. Also, the central portion 7 has made therein an elongated depression 9 that extends parallel with and is spaced from one edge 10 of said central portion. Integral with said portion 7 and extending at right angles thereto from the edge 10 thereof and parallel with said depression is a supporting flange 11 the outer margin 12 of which is turned to a position opposite to and parallel with the inner face of said central portion.

The holder and the roller are assembled by placing the roller upon the flange 11 with its trunnion 5 extending into the depression 9 in which the trunnion is adapted to move freely while the roller travels rotatively upon the flange.

Integral with the edge 13 of the central portion 7 opposite the flange 11 extends a flange 14 at right angles thereto which overhangs the roller 3 and is longitudinally convergent with respect to the flange 11 so that in traveling upon the flange 11 from one end of the depression 9 to the other the roller approaches the flange 14 in its movement toward the outer end 15 of the holder.

Thus, when a line 16 is inserted in the holder between the roller 3 and the flange 14 and is drawn toward the outer end 15 of the holder the line becomes clamped between said roller and flange with pressure that increases directly as tension is applied to the line, and further movement of the line through the outer end of the holder is thereby prevented. By drawing the line backwardly from the outer end of the holder the roller travels rearwardly upon the flange 11 whereupon the pressure of the roller and the flange 13 upon the line is relieved so as to permit readjustment of the line with respect to the fastener or removal of the line therefrom. The depression 9 is formed in the plate of the holder by means of suitable dies (not shown) and forms a runway for the trunnion 5 on the roller whereby the roller is guided in its travel upon the flange 11, and the margin 12 of said flange is turned so as to abut the outer end of the roller which confines the roller to its operating position in the holder while permitting rolling movement thereof upon the flange 11. By thus forming the depression in the holder a runway for the trunnion is formed and the central portion of the holder is strengthened.

The inner end of the flange 11 has an extension 17 which is upturned into the path of the roller 3 so as to limit backward rolling movement thereof, and the inner end of the depression 9 extends backwardly beyond the corresponding end of the flange 11 a sufficient distance to permit insertion of the trunnion 5 of the roller therein before the extension 17 is upturned into position to prevent dislodgment of the roller. Thus, the roller is axially confined between the margin 12 and the central portion 7 of the holder while permitted to roll longitudinally upon the flange 11 to an extent limited by the forward end of the depression 9 which engages the trunnion, and the extension 17 on the rear end of the flange 11 which has engagement with the roller.

We claim:

1. A line fastener consisting of a holder having two laterally extending flanges that are longitudinally divergent, and having a depression disposed longitudinally in its central portion and parallel with one of said flanges, the last-mentioned flange having an upturned margin and also an upturned extension at its inner end, and a roller having a concave face and an axial trunnion at one end thereof extending into and guided in said depression, said roller being so disposed in said holder as to have rolling movement upon one of said flanges limited by said extension and clamping engagement with a line inserted between the roller and the opposite flange of said holder when the line is drawn therebetween in one direction.

2. A line fastener consisting of a holder having two laterally extending flanges that are longitudinally divergent, one of which is provided with an upturned portion along its outer edge and an upturned extension at its inner end, said holder having also a runway disposed longitudinally and parallel with the flange that has the upturned portion and that extends rearwardly beyond said extension, and a roller having a trunnion guided in said runway, said roller being held in constant contact with the last named flange by engagement of said trunnion in said runway and limited in its rolling movement upon the adjacent flange by said extension.

EDWIN A. FRIES.
VOLLMAR FRIES.